No. 698,190. Patented Apr. 22, 1902.
W. H. FENNER.
FINE FUEL FURNACE.
(Application filed June 4, 1900.)
(No Model.) 8 Sheets—Sheet 1.
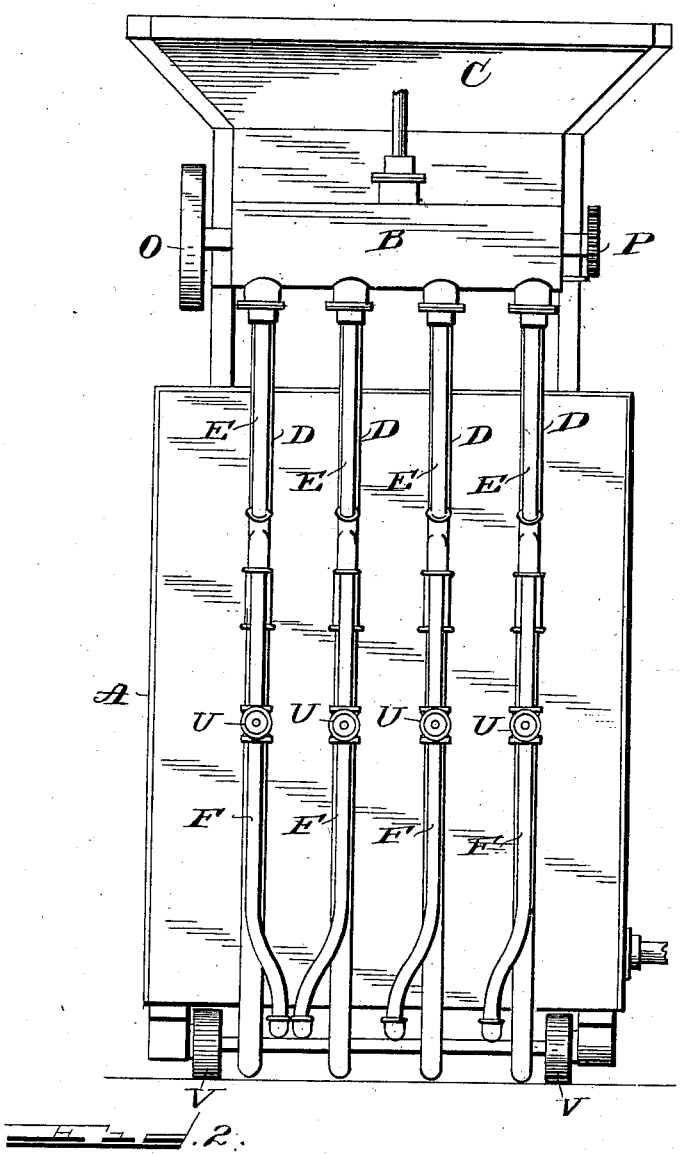
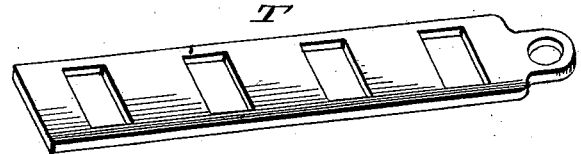

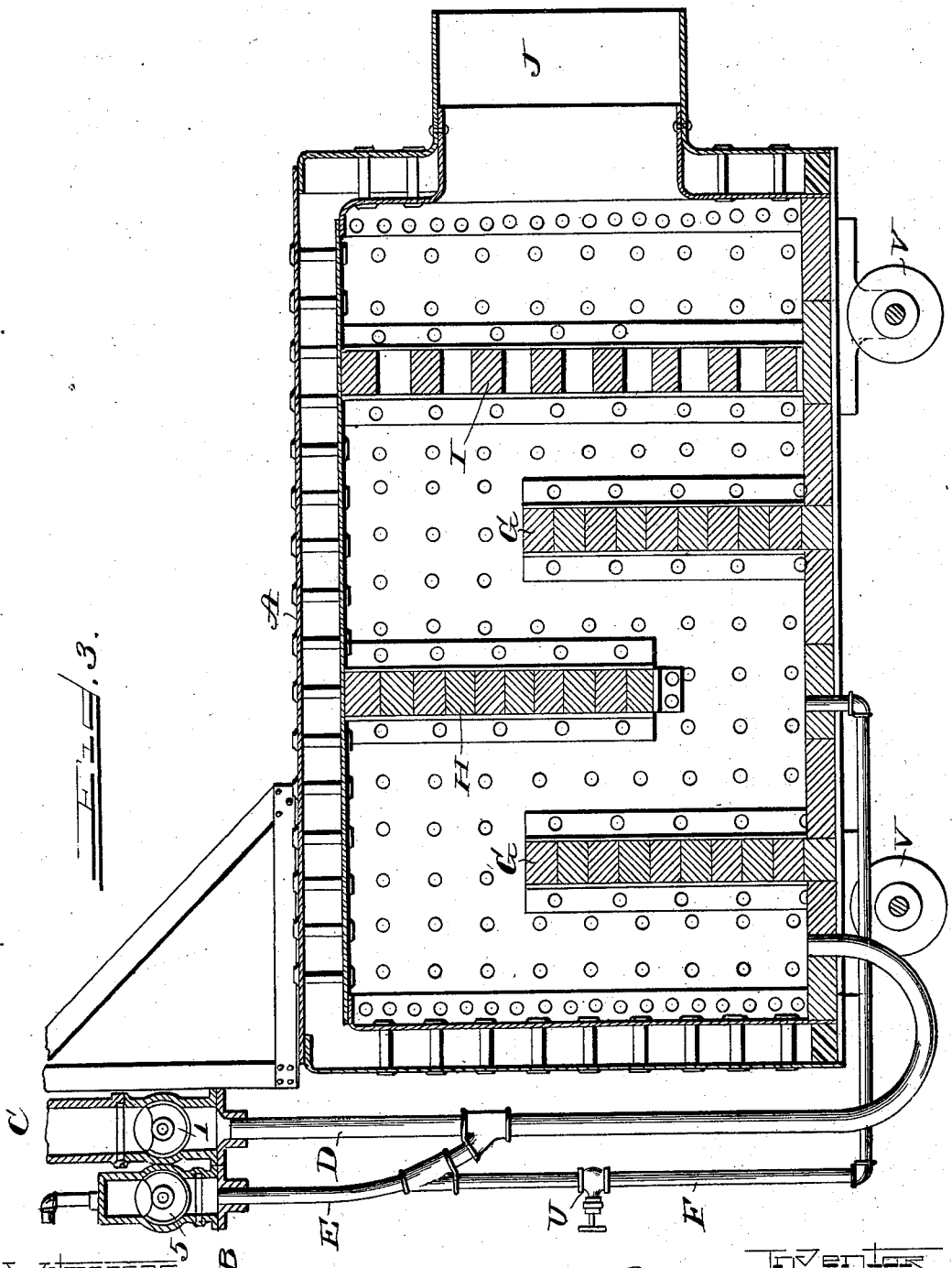

No. 698,190. Patented Apr. 22, 1902.
W. H. FENNER.
FINE FUEL FURNACE.
(Application filed June 4, 1900.)
(No Model.) 8 Sheets—Sheet 3.
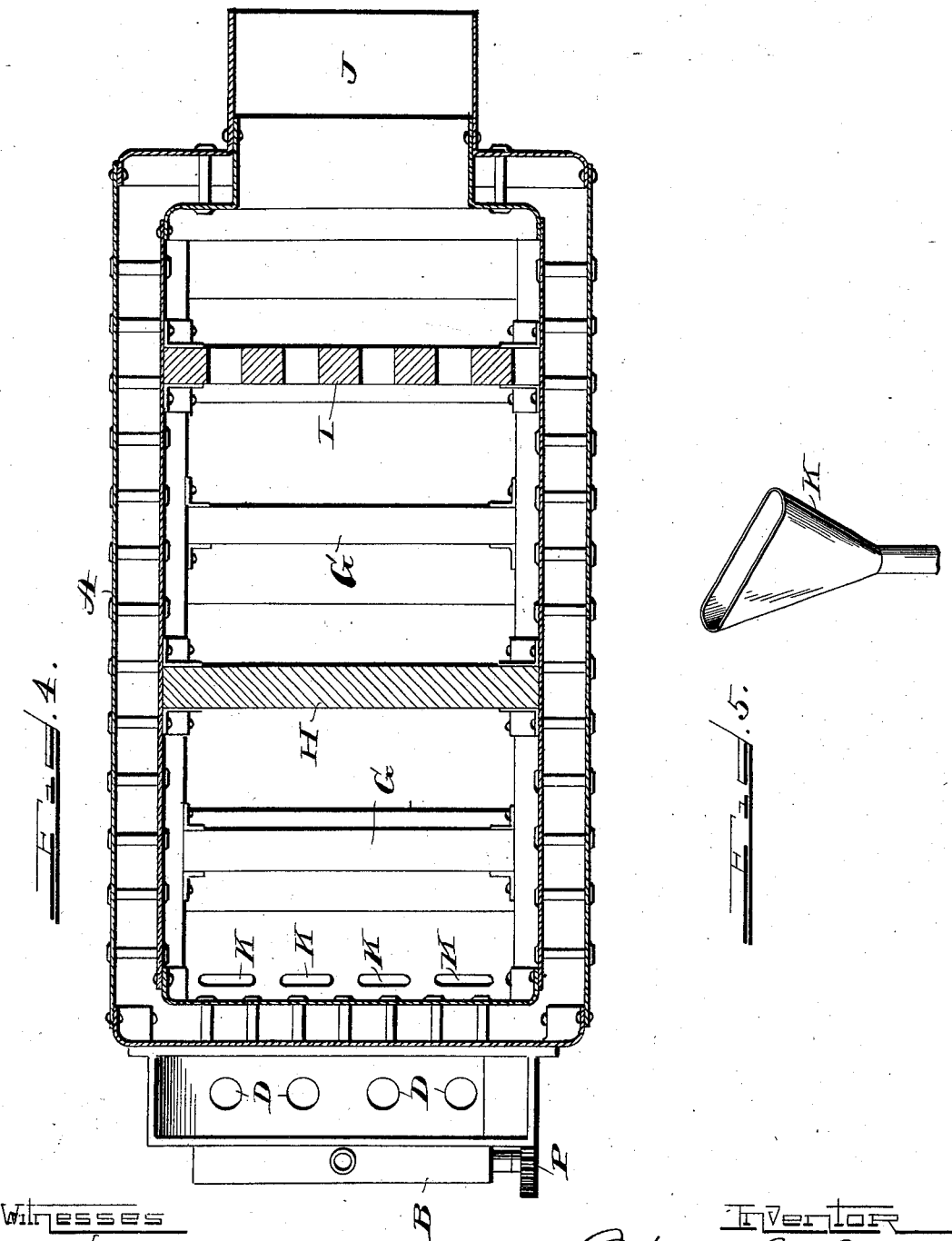

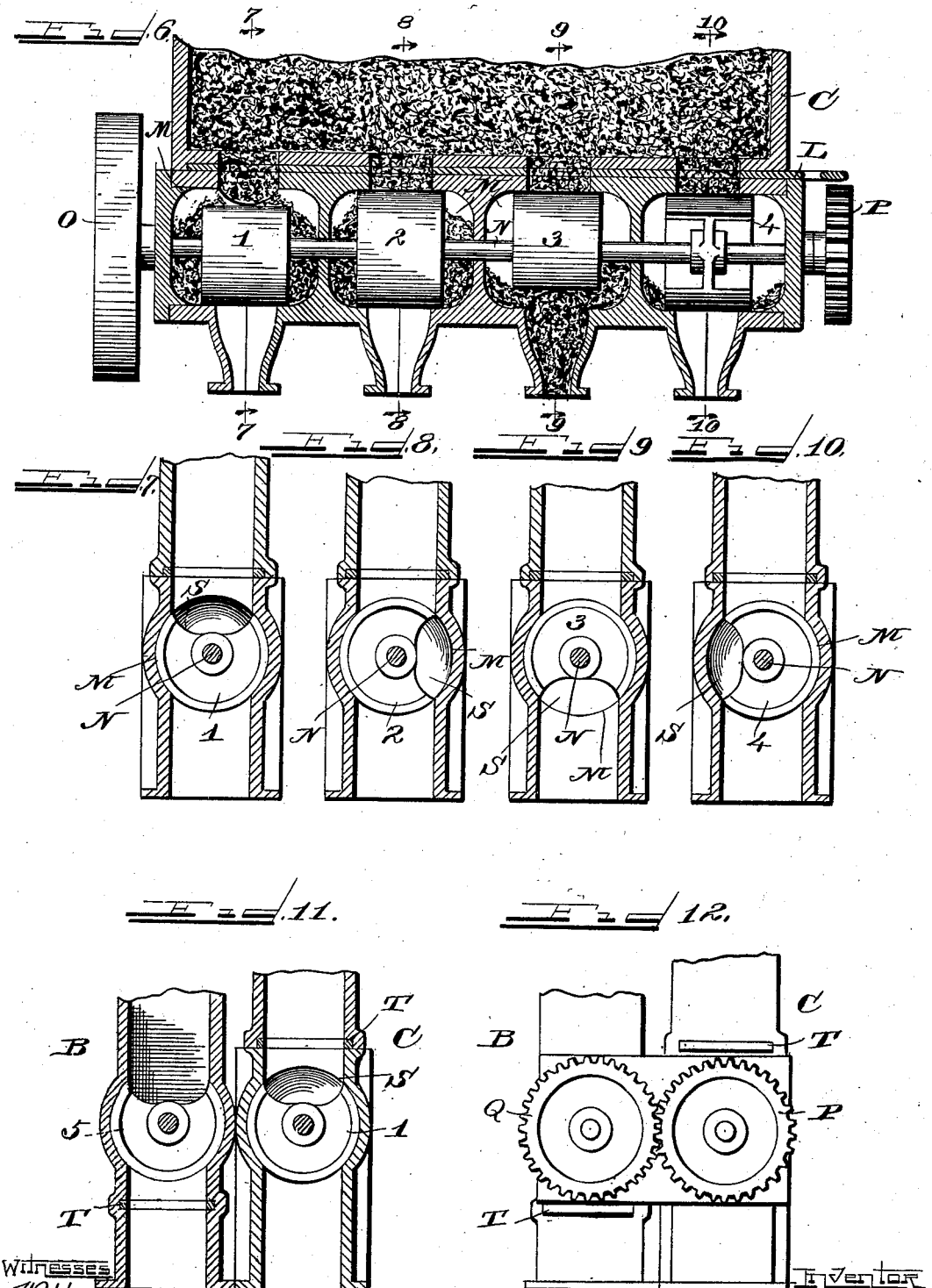

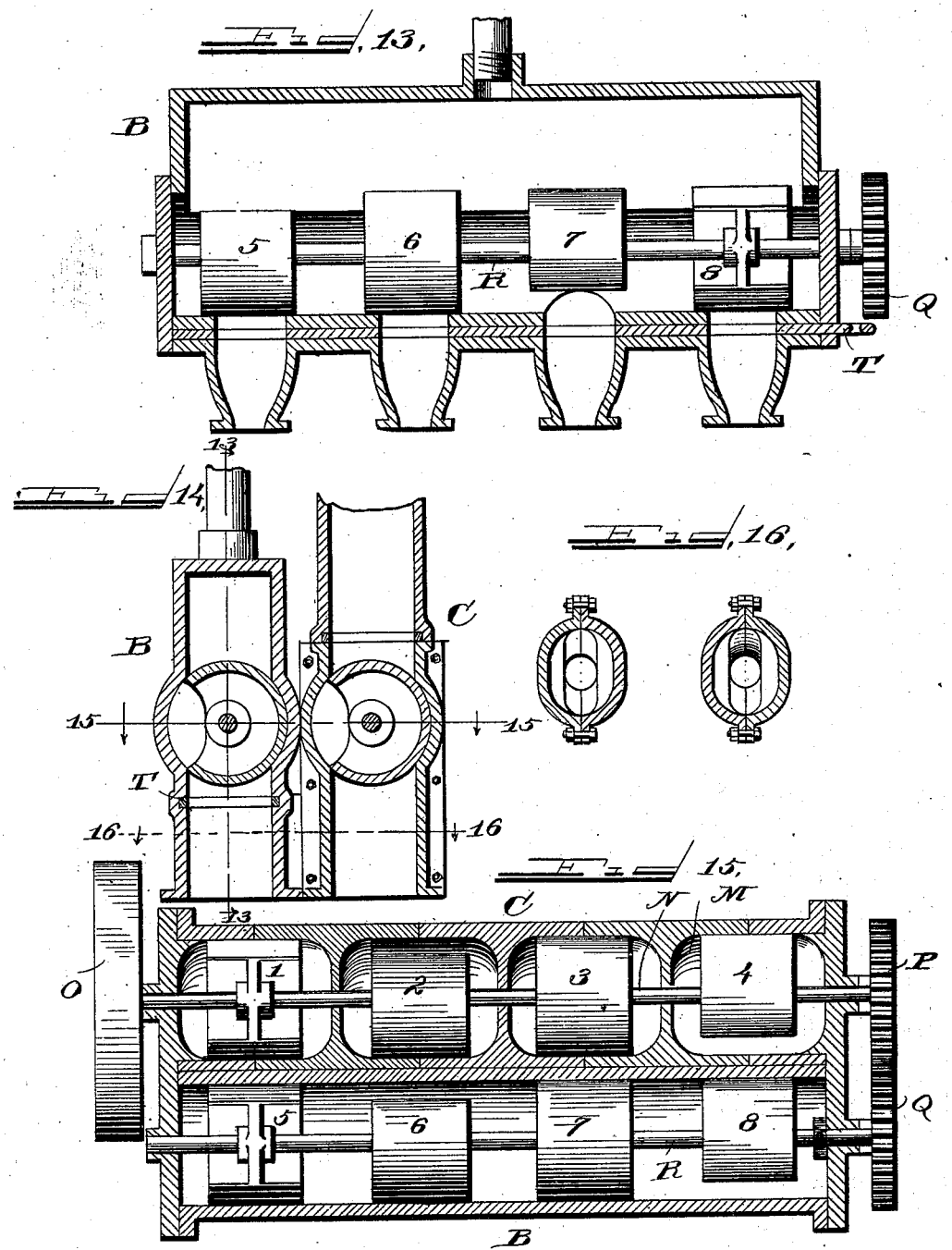

No. 698,190. Patented Apr. 22, 1902.
W. H. FENNER.
FINE FUEL FURNACE.
(Application filed June 4, 1900.)
(No Model.) 8 Sheets—Sheet 6.
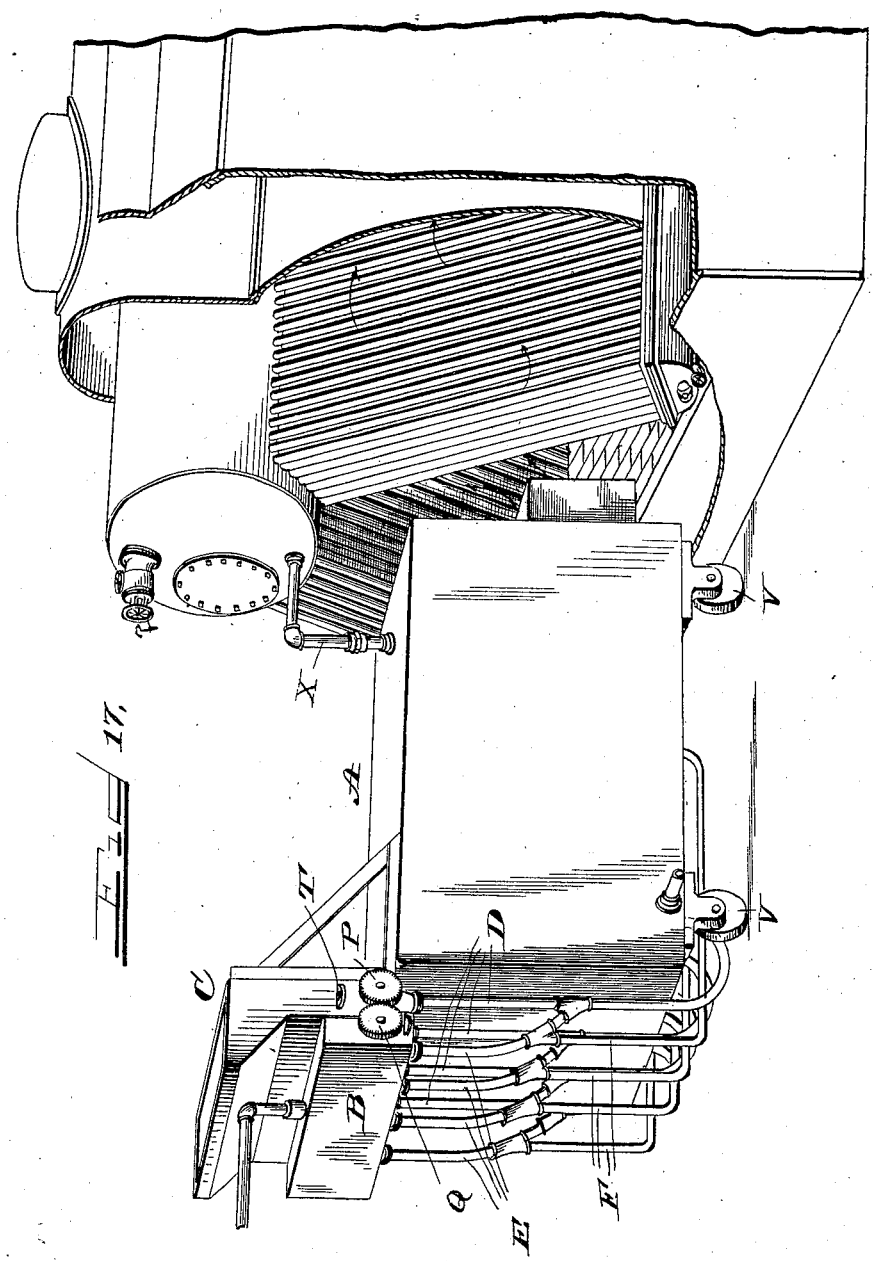

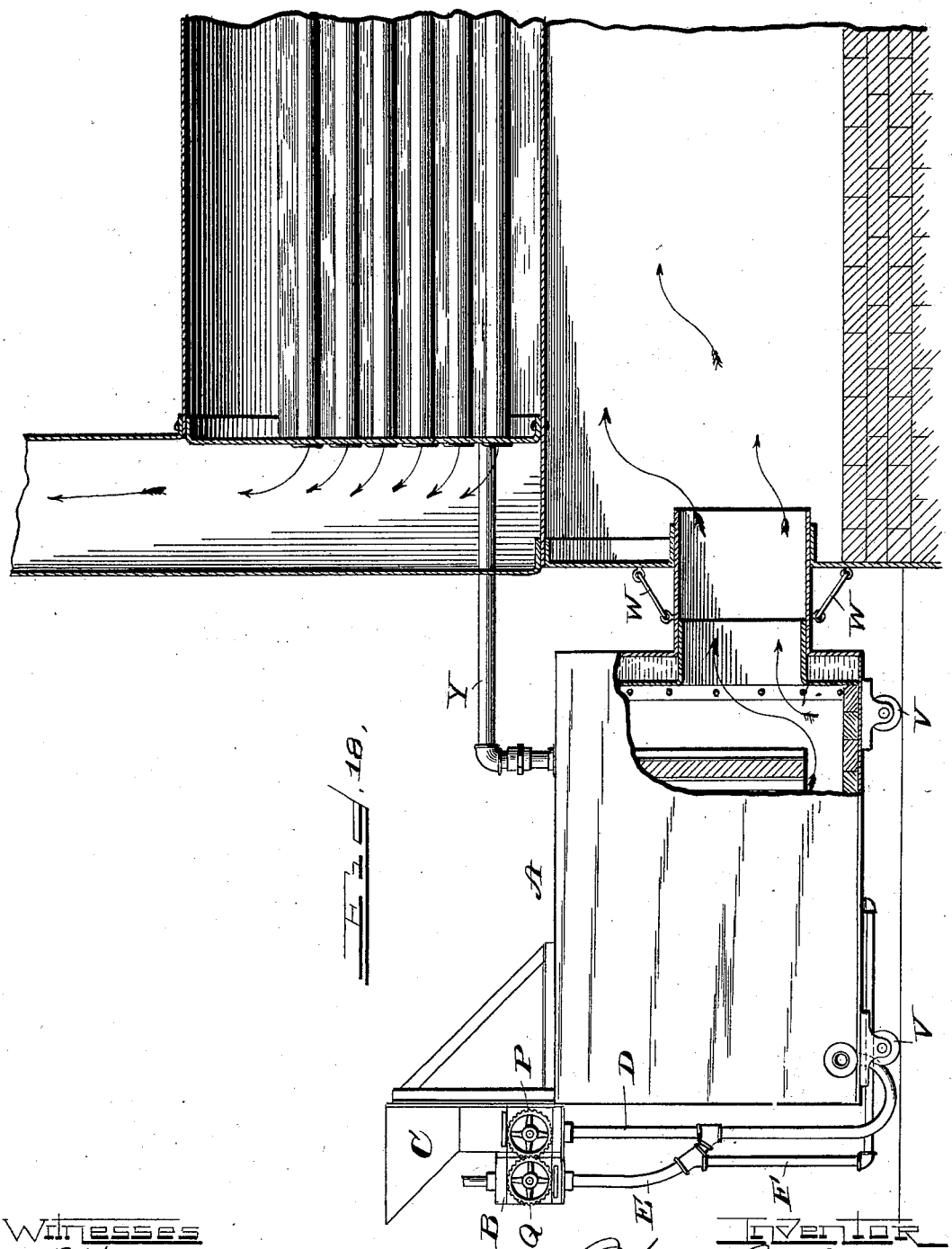

No. 698,190. Patented Apr. 22, 1902.
W. H. FENNER.
FINE FUEL FURNACE.
(Application filed June 4, 1900.)
(No Model.) 8 Sheets—Sheet 8.
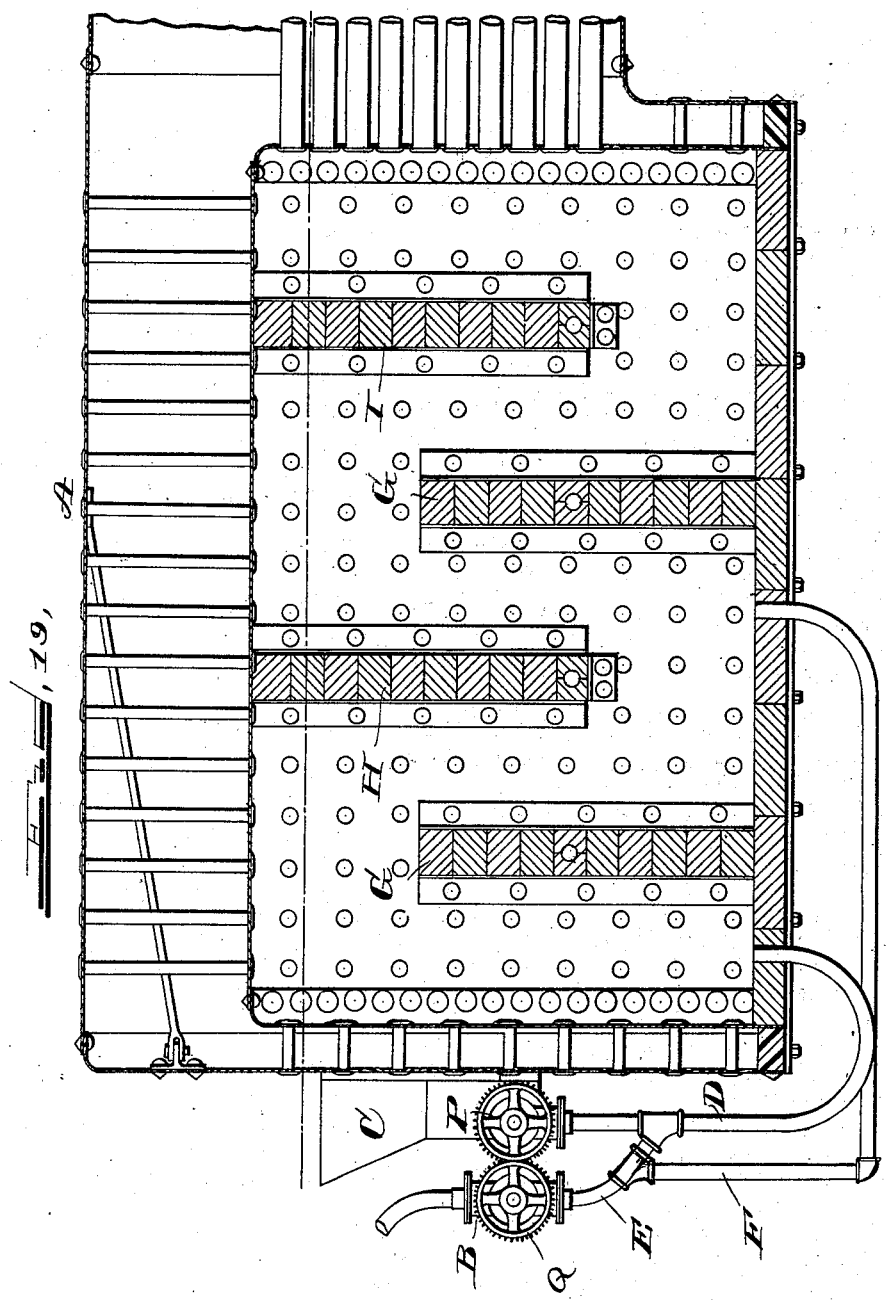

UNITED STATES PATENT OFFICE.

WILLIAM H. FENNER, OF CHICAGO, ILLINOIS.

FINE-FUEL FURNACE.

SPECIFICATION forming part of Letters Patent No. 698,190, dated April 22, 1902.

Application filed June 4, 1900. Serial No. 18,991. (No model.)

*To all whom it may concern:*

Be it known that I, WILLIAM H. FENNER, a citizen of the United States, residing at Chicago, in the county of Cook and State of Illinois, have invented certain new and useful Improvements in Fine-Fuel Furnaces, of which the following is a specification.

This invention relates to improvements in that class of furnaces designed for the burning of fuel which is fed thereto in a finely-divided state, some such furnaces being especially designed for consuming pulverized "soft" coal, although most of them known to me have been especially designed for consuming pulverized "hard" or anthracite coal. Many objections to this class of furnaces have developed in practice, chief among which is the lack of economy in the use of fuel, due partly to the blasting of the fuel through the furnace before it has opportunity to be consumed and partly to imperfect combustion and consequent partial consumption, due to the failure in supplying the proper amount of oxygen to support theoretically perfect combustion. While many prior patentees have claimed to get the nearest possible approach to theoretically perfect combustion by means of the apparatus devised by them, none of such apparatus, so far as I am aware, is capable of meeting the requirements to get the result aimed at, because none of them are capable of perfectly regulating the proportions of the fuel and air supplied to the furnace and especially are incapable of such variation of the proportions of the fuel and the air as to adapt the furnace for consuming different kinds of coal, whether hard or soft. Furthermore, so far as I am aware, all such prior furnaces have constituted a part of the boiler-setting in the manner customary with ordinary coal-furnaces, and notwithstanding some of such prior furnaces have been provided with tortuous passages by means of bridge-walls and arches nevertheless the complete combustion in such furnaces does not take place until the products of combustion are practically in contact with the boiler-flues, and as practically no combustion can initiate in the flues, because of the absence of oxygen, a considerable quantity of the fuel is of necessity blown out of the furnace and wasted in a partially or wholly unconsumed state.

The primary object of my invention is to have the supply of air and fuel to the furnace so controlled that the proportions thereof may not only be regulated so as to insure the nearest approach to theoretically perfect combustion, but they may be also varied so as to obtain substantially the same conditions of so-called "perfect combustion" with various kinds of coal, whether hard or soft, Another object is to have the supply of air and fuel capable of such control and adjustment that the fuel and its proper admixture of air may be fed to the furnace simultaneously from a plurality of jets or twyers or successively therefrom and at such intervals as may be desired to produce the best results, thereby enabling the production of a cyclonic or pulsating action of the blast in the furnace, insuring the thorough mixing of the air and fuel, as well as aiding in retarding the escape of the products of combustion from the furnace. It is obvious that this cyclonic or pulsating action in the combustion-chamber will be created and a direct current through the combustion-chamber retarded or prevented by this intermittently-recurring discharge of air or other fluid fuel element into the combustion-chamber.

A further object is to have the furnace separate and independent from the boiler and boiler-setting, whereby it may be applied to and used in connection with different boilers and with boilers of either the "stationary" or "marine" type.

A further object is to utilize the furnace proper as a feed-water heater for the boiler.

A further object is to have the initial combustion take place in the furnace under pressure and the products of combustion delivered therefrom through a contracted discharge-opening in the form of burning gases directly to the boiler-tubes, whereby the greatest efficiency in heating is assured and a condition of practically perfect combustion established before the products of combustion escape from the furnace and are delivered to the boiler.

A still further object of my invention is to have the furnace hermetically sealed and to introduce the proper admixture of pulverized fuel and air therein under a pressure of several atmospheres, to compel the burning gases to traverse a tortuous passage through the furnace, so as to retard their exit and establish practically perfect combustion, and to discharge the products of combustion from the furnace through a narrow or contracted passage into expansive chambers where the burning gases will come in contact with the objects to be heated, such as the flues of a boiler, through or around which the gases will pass.

These and such other objects as may hereinafter appear are attained by the devices illustrated in the accompanying drawings, in which—

Figure 1 is a front elevation of a furnace embodying my invention. Fig. 2 is a detail perspective view of the slide-valve. Fig. 3 is a central longitudinal section through the furnace. Fig. 4 is a horizontal section thereof. Fig. 5 is a detail perspective view of one of the twyers. Fig. 6 is a vertical section through the fuel-hopper, showing the valves in elevation. Fig. 7 is a transverse section on the line 7 7 of Fig. 6. Figs. 8, 9, and 10 are views similar to Fig. 7, but taken, respectively, on the lines 8 8, 9 9, and 10 10 of Fig. 6. Fig. 11 is a transverse vertical section through the lower portion of the fuel-hopper and air-chest, showing the respective valves thereof in elevation. Fig. 12 is an end view of the lower portions of the fuel-hopper and air-chest, more clearly showing the gears for operating the valves. Fig. 13 is a longitudinal section through the air-chest, taken on the line 13 13 of Fig. 14, but showing the valves in elevation. Fig. 14 is a transverse vertical section through the air-chest. Fig. 15 is a horizontal section through the air-chest, taken on the line 15 15 of Fig. 14, but showing the valves in elevation. Fig. 16 is a horizontal section on the line 16 16 of Fig. 14 looking in the direction indicated by the arrows. Fig. 17 is a perspective view showing a furnace embodying my invention as applied to a marine boiler. Fig. 18 is a sectional elevation showing a furnace embodying my invention as applied to an ordinary type of stationary boiler; and Fig. 19 is a vertical section through a locomotive fire-box, showing my invention applied thereto.

Similar letters of reference indicate the same parts in the several figures of the drawings.

I may here state that the particular shape and construction of a furnace embodying my invention is not material, so long as the furnace is hermetically sealed as against the admission of air at any point but the twyers, although, of course, the furnace may be supplied with hand-holes or doors through which access to the interior of the furnace may be gained for the purpose of cleaning and repairing it.

Referring now to the accompanying drawings, A indicates a furnace, which is preferably rectangular both in longitudinal and transverse section and preferably constructed of boiler-iron or some similar thick metal that will withstand the heat to which the furnace is subjected, although in practice, so far as the broad idea of my invention is concerned, the furnace may be principally composed of fire-brick. I prefer, however, to have it composed of boiler-iron with suitably-riveted end plates, so that the side, end, and top walls thereof may be double, as clearly shown in Figs. 3 and 4, to provide a water-space therebetween which not only serves to prevent early destruction of the inner walls of the furnace, but also enables the use of the furnace as a feed-water heater. The space between the side, end, and top walls and the bottom walls too, if desired, may be kept constantly full of water.

Preferably at the front end of the furnace and at any desired elevation is located an air-chest B and a fuel-hopper C, the latter being connected by pipes D, of which there may be any desired number, with the interior of the furnace at the bottom thereof, as clearly shown in Fig. 3. The air-chest is connected with each of the pipes D by a series of pipes E, corresponding in number with the pipes D, which pipes E may also be provided, if desired, with branch pipes F, leading to the interior of the furnace at a point farther along than that at which the pipes D connect therewith, for the purpose of enriching the combustion-chamber with oxygen if it should prove desirable or necessary with certain kinds of coal.

The furnace-interior is preferably divided by the walls G and the arches H into a tortuous passage, the last wall I toward the discharge end of the furnace, if desired, being made into "checker-work," so as to coöperate with the walls G and arches H in retarding the products of combustion through the furnace, the walls G rising from the floor of the furnace, while the arches H depend from the top thereof. The fuel and air supply enters the furnace by the pipes D forward of the front wall G—that is, between said wall and the front end of the furnace—and hence the products of combustion in passing through the furnace must pass successively over the walls G and under the arches H until they reach the rear end of the furnace, whence they are discharged through the contracted opening J into the ordinary fire-box or into the flues of an ordinary boiler. To disseminate as effectively as possible the fuel and its admixture of atmospheric air, which supports combustion, the ends of the pipes D where they enter the furnace are widened and provided with the twyers K, which preferably have the general outlines of a flattened funnel, as plainly shown in Fig. 5, so that the discharges from the various twyers cross and intersect each other at their point of entrance in the furnace, and thus tend to most effectively promote and insure not only thorough intermixing of the fuel and air, but also a cyclonic action of the currents of air and fuel as they enter the furnace, which thus prevents the setting up of any direct current through the furnace from end to end, which would cause a rapid passage of the fuel and burning gases through and out of the furnace before proper consumption thereof and which would also interfere with and to a great extent prevent a proper admixture of the pulverized fuel and air, such as is necessary to produce practically perfect combustion. The all important and controlling element, however, in furnaces of this class is a proper proportioning of the supply of air to the supply of pulverized fuel, so that just the right quantity of oxygen will be supplied to the fuel to support practically perfect combustion—that is, the nearest possible approach to theoretically perfect combustion. This difficulty is encountered with each change of fuel and even with atmospheric changes or wind conditions, and while many arrangements have heretofore been proposed for varying these proportions to fit the varying requirements I am not aware that any of such arrangements have ever been proposed that will produce the desired result. By my invention, however, I have attained this desirable result by providing the fuel-hopper and the air-chest with intermittently-operating controlling-valves, whereby the proportions between the fuel and the air may be varied at will and adjusted to fit any conditions either of the atmosphere or of the different kinds of fuel employed, and when once adjusted the proportions will be automatically maintained as long as desired These valves are arranged to intermittently operate at normally recurring intervals as distinguished from those valves in the art which operate at irregular intervals under abnormal or irregularly recurring conditions, such as valves which shut off the fuel-supply whenever the boiler-pressure exceeds any predetermined point. In my device whenever the mechanism is in full operation these valves will operate intermittently as a necessary feature of the normal operation of the device. To this end I have provided, first, a series of discharge-ports in the bottom of the fuel-hopper C with a slide-valve L, by means of which the size of the discharge-openings may be varied at will, and thus more or less fuel be permitted to pass from the hopper into the feed-chambers M below the same, from whence the fuel is discharged into the pipes D and from thence fed to the furnace. The feed-chambers may be of any desired number, according to the size of the furnace, and in each chamber is located a valve which alternately opens to admit fuel into said chamber from the hopper and to discharge said fuel from the chamber to its corresponding pipe D. In the drawings and particularly in Figs. 6 to 15, inclusive, I have shown four of these feed-chambers and a corresponding number of valves, which for convenience I will number 1, 2, 3, and 4. These valves are of the rotary type and are fixedly mounted upon a shaft N, suitably journaled in the casing of the chambers and driven by power from any suitable source, a belt-pulley O being shown in the drawings as mounted upon one end of the shaft to communicate power thereto, while upon the opposite end of the shaft is mounted a gear-wheel P, which meshes with a corresponding gear-wheel Q, mounted upon a second shaft R in the air-chest, which carries a series of rotary valves 5, 6, 7, and 8, corresponding in number and in operation with the valves 1, 2, 3, and 4 of the fuel-hopper. All of these valves are designed to be adjustable upon their respective shafts in any of the well-known ways that will readily suggest themselves to one skilled in the art, so that the valves may be set to operate simultaneously in each series or in both series or successively and at such intervals as may be deemed best to produce the best results in combustion.

I prefer that the fuel-valves and their corresponding air-valves should act successively and at such speed as will produce the best results, so that the discharge therefrom into the furnace will be successive and at different points across the front of the furnace, so that no regular or steady current may be set up in the furnace that would tend to swiftly carry the products of combustion through and out of the furnace without proper opportunity for the thorough combustion of all of the fuel. Indeed, such successive introduction of the jets of combustible fuel and air will establish in the furnace a cyclonic action that will not only tend to retard the escape of the products of combustion from the furnace, but will thoroughly intermix the air with the fuel and break up the currents in such manner that practically complete combustion of the fuel will take place before the products of combustion leave the furnace. To this end and as illustrative of the preferred manner of using the furnace I have shown the valves, both for the fuel and the air, set upon quarters, so that as one valve ceases to supply fuel and air the other commences. Thus it will be seen that the valve 1, with its feed-pocket S uppermost, is open, so as to permit the charging of its feed-chamber M from the feed-hopper, although no fuel can escape therefrom. The valve 2 is on the first quarter and is so turned that its chamber, which has received its full charge of fuel, is cut off from both the fuel-hopper and the discharge-pipe D, leading to the furnace. The valve 3, however, is on the second quarter and is wide open, so as to permit the discharge of the fuel from its feed-chamber M to the furnace, while it is cut off from the fuel-hopper. The valve 4, which is on the fourth quarter, has discharged the contents of its chamber M and is now cut off from both the fuel-hopper and the furnace. All four valves being upon the same shaft, their operation is simultaneous, and while the valve 3 is completing its discharge into the furnace the valve 2 will commence operation, which will be completed by the time the valve 3 is closed, and during the discharge of the valve 2 the valve 1 will complete its operation, while in the meantime the valve 4, which has opened to receive a fresh charge from the fuel-hopper, will commence operation as the valve 1 ceases, so that these valves keep up a regular succession of operations, discharging fuel first from one and then from the other into the furnace.

The air-valves 5, 6, 7, and 8, which are in synchronous movement therewith, due to the gearing between their respective shafts N and R, are preferably substantially like the valves 1, 2, 3, and 4 and successively open synchronously with the fuel-valves, so as to allow a blast of air to pass from the air-chest into the pipes E simultaneously with the passage of the fuel from the corresponding valves of the feed-chambers, the duration of the air-blast being so proportioned to the time of discharge of the fuel as to supply the desired and proper proportion of air with each charge of fuel. In practice I find it preferable to adjust the air-valves so that each valve will open shortly after the opening of its corresponding fuel-valve instead of being arranged exactly synchronous therewith. By this arrangement the air for each charge is not admitted to the full-supply pipe until after the fuel has passed the junction between the fuel-pipe and its corresponding air-supply pipe, so that the expansive force of the air in each charge is exerted primarily behind the fuel for such charge. The ducts leading from the air-chest, as shown more clearly in Figs. 13 and 14, are also provided with a slide-valve T, by means of which the size of the discharge-opening from said valves may be readily and simultaneously varied, thus providing for an exact proportioning of the air to the fuel according to the requirements of the particular kind of fuel being used. The proportioning may be further refined by a proper variation of the speed of rotation of the valves as well as by the pressure of the air in the chest, and by changing the gears P and Q, so as to vary the speed of rotation of the shafts N and R, carrying the air and fuel valves, the proportions of air and fuel fed to the furnace may be varied and regulated with certainty.

In Fig. 3 I have shown the auxiliary pipe F, leading from the air-pipes E to a point in the furnace beyond that at which the fuel is fed in, as supplied with valves U, by means of which the products of combustion may be enriched with oxygen, if it should be found necessary under certain conditions or with different kinds of fuel, although generally the complete control over the supply of air and fuel afforded by the supply-valves will be ample to secure the desired proportions of air and fuel to produce practically perfect combustion.

Another important feature of my invention is the tortuous passage through the furnace, taken in connection with the supply-valves, which serves to so retard the products of combustion that practically all of the fuel will be reduced to the form of a burning gas before it is discharged from the furnace, and notwithstanding that the combustible mixture is delivered to the furnace under pressure, which preferably equals several atmospheres, for as the only supply of oxygen to support combustion comes through the fuel-feed pipe and the discharge-opening from the furnace is contracted or restricted the pressure in the furnace, as well as the rapidity of the current therethrough, may be readily controlled and regulated to produce the best results. Furthermore, by having the furnace provided with double walls it is made capable of subserving the purpose of a feed-water heater, and if located below the water-line of the boiler and in open communication therewith it will not only make steam, which forms in the boiler during the initial combustion in the furnace, but such steam-producing capacity will be increased to the maximum by the subsequent discharge of the products of combustion around or through the boiler-tubes, thus utilizing to the fullest extent the heat units in the fuel.

As before stated, it is one of the objects of my invention to not only utilize the furnace as a feed-water heater, but to also have it separate and independent from the boiler and its setting, taking the place of the ordinary fire-box of a boiler, producing the initial combustion therein and discharging into the ordinary fire-box of a boiler of any kind the burning gases for further heating the boiler. To this end it is preferable to have the furnace mounted upon the wheels V, as shown in the drawings, so that it may be readily portable to and from the furnace, being retained in juxtaposition to the furnace while in use in connection therewith in any suitable manner, such as by the links W. (Shown in Fig. 18.)

In Fig. 17 I have shown my furnace as applied to a common type of marine boiler, the discharge-spout J of the furnace simply projecting into the ordinary fire-box of the marine boiler, so as to discharge therein the burning products of combustion, which will act upon the water-tubes in like manner to a fire in the fire-box, the furnace in this instance being also preferably connected, as by the pipe X, with the boiler, so as to act as a feed-water heater therefor.

In Fig. 18 the furnace is shown in connection with an ordinary stationary boiler, the products of combustion in this instance being discharged into the relatively large fire-box of the boiler and passing back to the rear end of the boiler and thence forward through the flues in the usual manner. In this construction the pipe Y serves to connect the furnace with the boiler, so as to enable its use as a feed-water heater in connection therewith.

In Fig. 19 I have shown my furnace as directly applied to and incorporated with the construction of a locomotive, the furnace taking the place of the ordinary fire-box and the usual tubes subserving the purpose of the contracted discharge-port J in the previously-described construction.

My invention will be found to be of particular value in connection with marine boilers, because the fuel and air supplies therefor may be located at a considerable elevation above the boilers and furnace, so that in case of accident to the vessel or of leakage the supply of fuel to the boilers, and consequently the making of steam, may be continued until the discharge-opening of the furnace is completely submerged. Furthermore, in case of injury of any kind resulting to the furnace from any cause it may be quickly and conveniently rolled to one side and another furnace substituted therefor with comparatively small loss of time or a material reduction in the steam-pressure. Thus valuable sailing time for a vessel will be saved, and, indeed, where the furnace is used in connection with a stationary boiler the shutting down of the plant to repair the furnace may be avoided in the same way.

In practice it will be advantageous to provide the feed-pipes D with butterfly or check valves to overcome the effect of back pressure either when the feed in said pipe is arrested or in the event of an explosion of the gases in the furnace, the application of such a valve being so simple and well understood in the art that I have deemed it best not to complicate the drawings by illustrating the same. In practice it may also be found desirable to mix gas of some suitable kind with the air supplied from the air-chest—that is, some gas that will enrich the air, so as to promote combustion. It will also be found that in practice the fuel and air feed devices may be employed in connection with a permanent furnace-setting instead of the portable and movable furnace illustrated in the drawings, an example of such use being afforded by the construction shown in Fig. 19, where the furnace is in reality a locomotive fire-box. By analogy, therefore, the furnace may form a permanent part of either a stationary or a marine boiler setting. It is further obvious that the fuel and air feeding devices controlled and operated substantially as herein shown and described may be used in conjunction with other forms of furnace-settings than those herein shown and described, although the best results will be obtained by the use of such devices in connection with a hermetically-sealed furnace having the tortuous passage and contracted discharge-opening, such as is herein illustrated and described. Indeed, I am aware that many changes and modifications in the construction and arrangement of a furnace embodying my invention may be made without departing from the spirit thereof, and all such changes are contemplated by my invention.

The essential and important requirement of all furnaces embodying my invention is that the air, as well as the coal, shall be fed to the furnace in measured quantity or charges, and, indeed, to get the best result the air should be measured as accurately as the fuel, and each charge of fuel should be accompanied by a charge of air accurately measured, so as to support as nearly as possible theoretically perfect combustion of the fuel when discharged into the furnace. This result I accomplish by having the fuel-valves and the air-valves intermittently operating, as it would be impossible to either measure or proportion the fuel or air if the valves controlling the supply of fuel and air were continuously open or the fuel or air were continuously fed through a valve adjustable only as to the quantity of fuel or air fed thereby. In the preferred embodiment of my invention the valves controlling the supply of fuel and air are not only intermittently operating, so as to deliver the fuel and air in successive jets or accurately-measured charges, but they are also adjustable in such manner as that the rapidity with which the charges are fed to the furnace, as well as the amount or quantity fed at each opening of the intermittently-operating valves, may be adjusted with such accuracy and nicety as to meet all of the varying conditions encountered in burning the different kinds of fine fuel; also, by these means the quantity of air in each measured charge may be varied without varying the pressure or velocity at which such charge of air is supplied to the furnace. Whenever the volume of air constituting a charge of air is admitted to an air-supply pipe, the corresponding air-valve is closed and remains closed for a definite interval. In this respect my device differs from all devices in which a normally continuous flow of air to the furnace is varied by means of irregularly-operating control-valves.

The process of combustion which has been described in this specification is the subject of another copending application filed by me July 31, 1901, Serial No. 70,347.

Having thus described my invention, what I claim, and desire to secure by Letters Patent, is—

1. The combination with a fine-fuel furnace, of means for supplying thereto in suspension and in rapid succession measured charges of air and fuel combined, substantially as described.

2. The combination with a fine-fuel furnace, of means for supplying thereto in suspension successive charges of air and fuel combined, said means comprising a chamber between the furnace and the source of fuel-supply, within which chamber the air and fuel are combined, substantially as described.

3. The combination with a fine-fuel furnace of means for supplying thereto air and fuel in successive measured charges, said means being adjustable so as to vary the quantity of air and fuel contained in each charge, substantially as described.

4. The combination with a fine-fuel furnace, of a series of valved fuel-supply pipes, a series of valved air-supply pipes, each of said series connecting their respective sources of supply with the furnace, and means for causing the supply-pipes of each series to operate successively and intermittently, substantially as described.

5. In a fine-fuel furnace, the combination with a combustion-chamber, of means for feeding the blasts of fine fuel upwardly to a zone of combustion therein and in rapid succession, substantially as described.

6. The combination with a fine-fuel furnace, a fuel-hopper and an air-chest, of series of valved pipes connecting said hopper and chest respectively with the furnace, and means for supplying air and fuel to the furnace through said series of pipes simultaneously or successively but intermittently, substantially as described.

7. The combination with a hermetically-sealed fine-fuel furnace provided with a tortuous combustion-chamber and a contracted discharge-opening, of means for supplying a mixture of air and fuel to said furnace in a series of jets operating successively or simultaneously but intermittently, substantially as described.

8. The combination with a hermetically-sealed fine-fuel furnace, having a tortuous combustion-chamber and a contracted discharge-opening, of series of valved air and fuel supply pipes connected at intervals with said furnace, the valves in said pipes being adapted to operate successively or alternately but intermittently, substantially as described.

9. The combination with a hermetically-sealed fine-fuel furnace having a tortuous combustion-chamber and a contracted discharge-opening, of an air-chest and a fuel-hopper respectively connected with the furnace at intervals, the supply of air and fuel being simultaneous through each connection, and all said connections operating simultaneously or successively but intermittently, substantially as described.

10. In a fine-fuel furnace, means for supplying a fluid fuel element thereto, said means comprising a series of pipes connecting said furnace with a source of supply, and a corresponding series of successively and intermittently operating valves for controlling the admission of said fluid fuel element to said pipes from said source of supply, substantially as described.

11. In a fine-fuel furnace, means for supplying a fluid fuel element thereto, said means comprising a series of pipes connecting said furnace with a source of supply, and a corresponding series of intermittently-operating valves for controlling the admission of said fluid fuel element from said source of supply to said pipes, said valves being arranged to operate either simultaneously or successively, all substantially as described.

12. The combination with a fine-fuel furnace, of a fuel and air feeding mechanism comprising a fine-fuel hopper, a series of pipes connecting the same with the furnace, a corresponding series of feed-chambers, a corresponding series of adjustable intermittently-operating valves controlling ports connecting said chambers with the hopper and with the pipes, a slide-valve for simultaneously controlling the ports leading from the hopper to the feed-chambers, and means for supplying air in measured charges to the feed-pipes, substantially as described.

13. The combination with a fine-fuel furnace, of a fuel and air feeding mechanism comprising a fine-fuel hopper, a series of pipes connecting the same with the furnace, a corresponding series of feed-chambers, a corresponding series of adjustable intermittently-operating valves controlling ports connecting said chambers with the hopper and with the pipes, a slide-valve for simultaneously controlling the ports leading from the hopper to the feed-chambers, an air-chest, a series of pipes corresponding in number with the fuel-pipes and connecting said chest with the furnace, and a series of adjustable intermittently-operating valves located in said chest and controlling the discharge-ports leading therefrom to the air-pipes, substantially as described.

14. The combination with a fine-fuel furnace, of a fuel and air feeding mechanism comprising a fine-fuel hopper, a series of pipes connecting the same with the furnace, a corresponding series of feed-chambers, a corresponding series of adjustable valves controlling ports connecting said chambers with the hopper and with the pipes, a slide-valve for simultaneously controlling the ports leading from the hopper to the feed-chambers, an air-chest, a series of pipes corresponding in number with the fuel-pipes and connecting said chest with the furnace, a series of adjustable valves located in said chest and controlling the discharge-port leading therefrom to the air-pipes, and a slide-valve for controlling the ports leading from the air-chest to the air-pipes, substantially as described.

15. The combination with a fine-fuel furnace, of a fuel and air feeding mechanism comprising a fine-fuel hopper, a series of pipes connecting the same with the furnace, a corresponding series of feed-chambers, a corresponding series of adjustable valves controlling ports connecting said chambers with the hopper and with the pipes, a slide-valve for simultaneously controlling the ports leading from the hopper to the feed-chambers, an air-chest, a series of pipes corresponding in number with the fuel-pipes and connecting said chest with the furnace, a series of adjustable valves located in said chest and controlling the discharge-port leading therefrom to the air-pipes, a slide-valve for controlling the ports leading from the air-chest to the air-pipes, and a gear connection between the series of fuel-valves and the series of air-valves, substantially as described.

16. In a fine-fuel furnace, the combination with a combustion-chamber, of means for supplying intermittent rapidly-succeeding and upwardly-directed blasts of fine fuel to a zone of combustion therein, substantially as described.

17. In a fine-fuel furnace, the combination with a combustion-chamber, of a plurality of twyers therein, and means for supplying rapidly-succeeding intermittent and upwardly-directed blasts of fine fuel in suspension alternately through adjacent twyers to a zone of combustion in said combustion-chamber, substantially as described.

18. In a fine-fuel furnace, the combination with a combustion-chamber, of a twyer arranged adjacent to the bottom thereof to direct blasts of fuel in an upward direction to a zone of combustion in said combustion-chamber, and means for supplying rapidly-succeeding intermittent blasts of fine fuel in suspension, through said twyers to said zone of combustion, substantially as described.

WILLIAM H. FENNER.

Witnesses:
M. E. SHIELDS,
J. E. HALLENBECK.